R. H. MIMS.

Improvement in Photographic Apparatus

No. 124,607

Patented March 12, 1872.

Witnesses,

Robert H. Mims
Lemuel W. Serrell
atty.

124,607

UNITED STATES PATENT OFFICE.

ROBERT H. MIMS, OF EDGEFIELD COURT-HOUSE, SOUTH CAROLINA.

IMPROVEMENT IN PHOTOGRAPHIC APPARATUS.

Specification forming part of Letters Patent No. 124,607, dated March 12, 1872.

*To all whom it may concern:*

Be it known that I, ROBERT H. MIMS, of Edgefield Court-House, in the State of South Carolina, have invented an Improved Attention Apparatus for use when photographing children; and the following is declared to be a correct description thereof.

Various means have been resorted to for fixing the attention of children long enough to take a perfect photograph, as it is difficult to keep them quiet without thus attracting them; and drums or other devices are employed for that purpose to make a noise, but these are apt to give the child an expression of surprise or wonder instead of a more natural expression of pleasure.

My invention consists in a toy, arranged so as to appear at short intervals, and which can be easily worked by the operator while attending to the camera.

Figure 1:
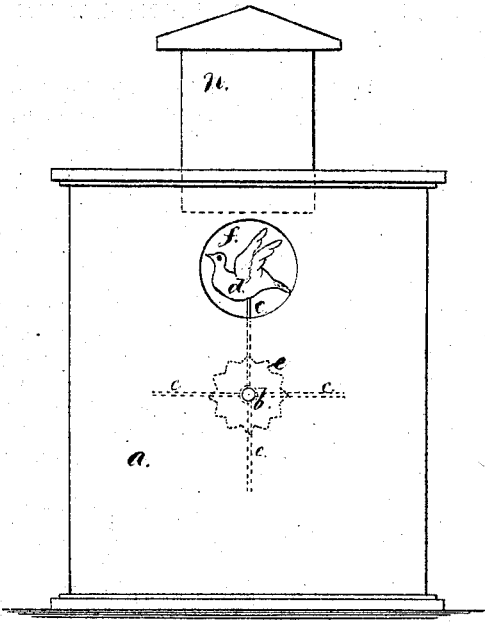
Figure 2:
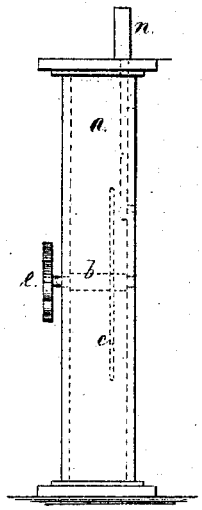
Figure 3:
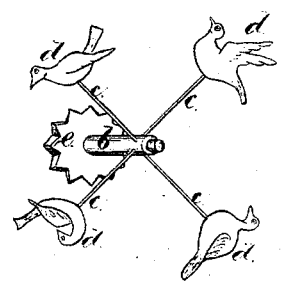

In the drawing, Figure 1 is an elevation of my apparatus. Fig. 2 is a side view of the same; and Fig. 3 is a detached perspective view of the revolving toy.

$a$ is a box, of a convenient size to be placed upon the camera or stand near the operator. The toy consists of the shaft $b$, carrying arms $c$, upon the outer ends of which are fastened the attractive toys, such as the birds $d$. This is placed in the box $a$, so as to be revolved by the thumb-wheel $e$ at the back of the box. An opening, $f$, is provided in the front of the box $a$ in such position that, when the shaft $e$ is revolved, the objects on the arms $c$ will appear and disappear from view at short intervals.

When birds are used they can be varied in position, such as at rest or flying, and they may be different in color, or alternated with other objects likely to amuse a child.

By this apparatus the attention of a child can be fixed upon one spot for a length of time sufficient to enable the operator to secure a clear picture; and the working of the apparatus is such as to amuse and interest a child, instead of startling it and giving an unpleasant expression to its face.

When desired, a slide, $n$, is employed to close the opening $f$, and this is withdrawn to exhibit the bird or toy.

I claim as my invention—

The toys upon the arms of a shaft, so as to be revolved, and combined with the box having an opening, substantially as and for the purposes set forth.

Signed by me this 23d day of December, A. D. 1871.

ROBERT H. MIMS.

Witnesses:
W. D. RAINEY,
J. W. QUARLES.